United States Patent
Henzler et al.

(10) Patent No.: US 6,726,590 B2
(45) Date of Patent: Apr. 27, 2004

(54) SPEED CHANGE TRANSMISSION ARRANGEMENT INCLUDING A CONTINUOUSLY VARIABLE TOROIDAL TRANSMISSION

(75) Inventors: Steffen Henzler, Böbingen/Rems (DE); Harald Feuchter, Leinfelden-Echterdingen (DE)

(73) Assignee: DaimlerChrysler AG, Stuttgart (DE)

(*) Notice: Subject to any disclaimer, the term of this patent is extended or adjusted under 35 U.S.C. 154(b) by 1 day.

(21) Appl. No.: 10/131,505

(22) Filed: Apr. 19, 2002

(65) Prior Publication Data

US 2002/0169048 A1 Nov. 14, 2002

(30) Foreign Application Priority Data

Apr. 28, 2001 (DE) .......................... 101 21 042

(51) Int. Cl.$^7$ .............................................. F16H 37/02
(52) U.S. Cl. ...................................... 475/216; 475/219
(58) Field of Search .................. 475/215, 216, 475/219

(56) References Cited

U.S. PATENT DOCUMENTS

| | | | | |
|---|---|---|---|---|
| 6,045,477 A | * | 4/2000 | Schmidt | 475/216 |
| 6,059,685 A | | 5/2000 | Hoge et al. | |
| 6,099,431 A | * | 8/2000 | Hoge et al. | 475/216 |
| 6,155,951 A | * | 12/2000 | Kuhn et al. | 475/216 |
| 6,171,210 B1 | * | 1/2001 | Miyata et al. | 475/216 |
| 6,251,039 B1 | * | 6/2001 | Koga | 475/216 |
| 6,358,178 B1 | * | 3/2002 | Wittkopp | 475/216 |
| 6,585,619 B2 | * | 7/2003 | Henzler | 475/214 |
| 2002/0019285 A1 | * | 2/2002 | Henzler | 475/214 |
| 2002/0045511 A1 | * | 4/2002 | Geiberger et al. | 475/216 |
| 2002/0187872 A1 | * | 12/2002 | Wehking | 475/216 |

FOREIGN PATENT DOCUMENTS

| | | |
|---|---|---|
| DE | 199 11 297 | 9/2000 |
| EP | 0 942 199 | 9/1999 |

* cited by examiner

Primary Examiner—Rodney H. Bonck
Assistant Examiner—Dennis Abdelnour
(74) Attorney, Agent, or Firm—Klaus J. Bach

(57) ABSTRACT

In a variable-speed transmission arrangement, a continuously variable toroidal transmission and a planetary aggregating transmission are arranged in the power path between an input shaft and a coaxial output shaft. A central intermediate shaft is mounted to the input shaft for rotation therewith and to an input disc of the toroidal transmission. A planet carrier is connected firmly to the central intermediate shaft which passes through a concentric intermediate shaft, to which an output disc of the toroidal transmission and a second transmission member of the output transmission are connected. A third transmission member of the aggregating transmission is connectable to the output shaft, by means of a first clutch in a low mode, and a fourth transmission member of the aggregating transmission is connectable to the output shaft by means of a second clutch in an upper driving mode. The input shaft can be drive-connected to the output shaft at a constant overall transmission ratio by means of a third clutch, so as to bypass the toroidal transmission.

14 Claims, 8 Drawing Sheets

SPEED CHANGE TRANSMISSION ARRANGEMENT INCLUDING A CONTINUOUSLY VARIABLE TOROIDAL TRANSMISSION

BACKGROUND OF THE INVENTION

The invention relates to a speed change transmission including a continuously variable toroidal transmission with a planetary aggregate drive structure.

In a known variable-speed transmission arrangement (U.S. Pat. No. 6,059,685), at least one double planetary gear structure, which consists of a main planet meshing with a secondary planet, is mounted on the double-webbed planet carrier of the output transmission. The planet carrier is mounted fixedly for rotation with the input shaft via a central intermediate shaft. The toroidal transmission is a two-chamber design, and is connected, by means of its one central driving disc, to the input shaft, by means of its other central driving disc to the planet carrier and by means of its central driven discs to the concentric intermediate shaft, the latter, in turn, being connected fixedly in terms of rotation to one of two sun wheels meshing with the main planet. The secondary planet meshes with an outer ring wheel which can be drivingly connected to the output shaft by means of the first shift clutch for the lower driving mode at lower driving speeds. The other sun wheel meshing with the main planet can be drivingly connected to the output shaft by means of the second shift clutch for the upper driving mode at higher driving speeds.

This known variable-speed transmission arrangement is already designed, in terms of its transmission ratio, with what is known as a geared-neutral function, by means of which, with the first shift clutch for the lower driving mode being in an engaged state, the rotational speed of the transmission members connected fixedly in terms of rotation (ring wheel of the output transmission and output shaft) is equal to zero when the part transmission ratio of the toroidal transmission is set at a negative absolute value lower than 1 which is dependent on the respective number of teeth of the output transmission. It is consequently unnecessary, for the start-up operation, to have a special drive component, such as, for example, a start-up converter or start-up clutch.

Furthermore, in this known variable-speed transmission arrangement, a transmission ratio designated as what is known as a synchronous point can be selected, in which the transmission members connected to the first shift clutch, on the one hand, and the transmission members connected to the second shift clutch, on the other hand, each have the same rotational speed, so that a change in the torque path from one clutch to the other, and therefore the transition from one driving mode to the other, can be completed in a way which is jolt-free, that is to say not noticeable by the driver.

By virtue of the above-described transmission configuration of the known gear shift transmission arrangement, the outer sun gear of the output transmission, which outer sun gear is connected to the first shift clutch for the lower driving mode, necessarily has a direction of rotation opposite to the direction of rotation of the input shaft, so that a reversing mode with a suitable transmission ratio is possible when the first shift clutch is engaged and, in the toroidal transmission, a negative partial transmission ratio dependent on the respective number of teeth in the output transmission is set with an absolute value lower than 1.

In a known gear-change transmission arrangement of a different type (EP 0 942 199 A2) operating with a continuously variable toroidal transmission, use is made not of a planetary output transmission, but of a countershaft which is arranged eccentrically outside the toroidal transmission and parallel to the input shaft and which is connected in each case by means of an axially offset drive, on the one hand, directly to the two central driven discs of the toroidal transmission designed on the two-chamber principle, and, on the other hand, via a first shift element in the form of a range clutch for forward driving, to the output shaft coaxial to the input shaft. In order to generate the frictional connection, necessary for torque transmission, between the respective roller and the toroidal frictional surfaces of the associated driving disc or driven disc in the toroidal transmission, the one first driving disc is connected to the input shaft, to be driven via a start-up element in the form of a torque converter, by means of a torque-dependent pressure device, the rolling-body-like intermediate members of which are in engagement with inclined surfaces formed on one or both device halves. The other second driving disc is with the input shaft either in rotationally fixed, that is to say direct drive connection or, via the pressure device of the first driving disc, in indirect torque-dependent drive connection. A simple planetary reversing transmission for forming a reverse gear is arranged in the force path between the second driving disc of the toroidal transmission and the coaxial output shaft, by which reversing transmission the inner central wheel is connected to the second driving disc and the outer central wheel is connected to the output shaft, in each case fixedly in terms of rotation, and also the planet carrier is connected to a non-rotating case part by means of a second shift element in the form of a reverse-gear brake and to the outer central wheel by means of a third shift element in the form of a direct-drive clutch. The transmission control is designed in such a way that in each case only one of the three shift elements can be activated, whilst at the same time the other two necessarily remain deactivated. Three transmission states are thereby defined, of which, in a first transmission state, the entire drive power is led to the output shaft via the toroidal transmission, bypassing the reversing transmission, as a result of the activation of the range clutch for forward driving and, in a second transmission state, as a result of the activation of the direct-drive clutch, the entire drive power is transmitted, bypassing the toroidal transmission, from the input shaft to the output shaft via the reversing transmission rotating as a block, whilst, in a third transmission state, as a result of the activation of the reverse-gear clutch, the entire drive power flows, bypassing the toroidal transmission, from the input shaft to the output shaft via the reversing transmission shifted to its reverse-gear transmission. Although the toroidal transmission is non-loaded both in direct drive and in reverse gear, it is nevertheless subjected to the full drive power in the variable-ratio forward-driving range, because operation with power splitting and subdivision into at least two reduction ranges is not possible because of the absence of a pick-off transmission. Moreover, a variable-speed transmission arrangement of this other type, with a torque converter and a bulky outer countershaft, cannot readily be accommodated in a transmission tunnel of a conventional vehicle.

DE 199 11 297 A1 specifies, for a variable-speed transmission arrangement of yet another type, with a continuously variable single-flow or multi-flow friction-wheel transmission with cone-like friction wheels arranged in opposition and rolling on one another directly or via a cylinder-like hollow body, that the change in the transmission ratio should take place by the axes of the friction wheels being tilted to a greater or lesser extent in relation to one another and intersecting at different angles. For this variable-speed transmission arrangement of another type, maximum efficiency in the important operating ranges and, in particular, also in the longer gears effective for consumption is claimed, and reference is made to the fact that it is at the same time of high performance and outstandingly adjustable. These advantages are to be achieved in that the drill-rolling ratio (spin) is smaller in operating ranges important for overall consumption than in the other operating ranges, in that the cone angle of the respective rolling tracks is smaller than in the remaining rolling tracks. Additionally or alternatively to this design of the drill-rolling ratio, in this variable-speed transmission arrangement of another type the non-positive friction-wheel transmission is to be capable of being bypassed, in the gear most important for overall consumption, by means of a shiftable direct through-drive or a shiftable gearwheel stage acting directly on the differential.

In the variable-speed transmission arrangement according to the invention, the input shaft is capable of being drive-connected to the output shaft by means of a third clutch, so as to bypass the toroidal transmission, thus providing a continuously variable vehicle transmission having, along with a compact design, a high efficiency in the consumption-relevant transmission ratios, which is achieved by virtue of the direct drive transmission which can be selected, as required, by means of the additional clutch.

In the variable-speed transmission arrangement according to the invention, the direct power transmission arrangement can be provided for the higher speed driving mode. During the change of the torque path from the third clutch associated with the direct drive arrangement to the second clutch associated with the variable transmission ratios of the upper driving mode, the rotational speeds of the connected transmission members can be synchronized at the second clutch by the adaptation of the variable part transmission ratio of the toroidal transmission, so that the change takes place in a way which is jolt-free, that is to say not detectable by the driver.

In the variable-speed transmission arrangement according to the invention, the transmission control can be designed in such a way that, if the desired value to be selected lies in the range of the constant overall transmission ratio, a comparison is carried out as to whether the current engine operating point leads, in conjunction with a constant transmission ratio, to a lower fuel consumption. If this is the case, the transmission is put into direct drive.

In the variable-speed transmission arrangement according to the invention, the transmission control can be designed, furthermore, in such a way that, in the case of a high power requirement, the transmission is operated as far as possible in direct drive. This measure has an advantageous effect particularly during acceleration operations and at high driving speeds.

As a rule, a variable-speed transmission arrangement of a motor vehicle is controlled for more than 60% of the entire driving time at transmission ratios lower than 1. The influence of these transmission ratios on the useful life of, in particular, the toroidal transmission is correspondingly high. In many driving situations, particularly during long distance travel or under full load, continuously variable speed conversion is actually not required.

In the variable-speed transmission arrangement according to the invention, it is therefore beneficial that the power flow can be led past the toroidal transmission via a bypass path, so as not to wear the toroidal transmission unnecessarily. By the direct drive according to the invention being in operation, the load on the toroidal transmission can, in conjunction with an appropriately adapted transmission control, be reduced by more than 20%. As a result of the reduced load on the toroidal transmission, the latter is afforded advantages in terms of useful life, construction size and efficiency.

In toroidal transmissions, the geometry of the traction surface on the respective pivotally movable intermediate roller, which is in frictional contact in each case with a driving disc and driven disc, often represents a compromise between useful life and efficiency. High efficiency is achieved with a frictional (contact) surface which is as small as possible; conversely, the load increases since the force acts on a smaller surface. By virtue of the lower load on the toroidal transmission which is achieved in the variable-speed transmission arrangement according to the invention, the geometry can be modified in such a way that higher efficiency is achieved.

As a result of the higher efficiency achieved in the variable-speed transmission arrangement according to the invention, the maximum possible final vehicle speed can be increased, so that there is no longer the disadvantage of a lower final vehicle speed in conventional continuously variable transmission arrangements, as compared with the higher final vehicle speeds possible in the case of multi-step transmissions.

In an embodiment of the variable-speed transmission arrangement according to the invention, the constant overall transmission ratio is 1:1 and represents therefore a direct drive.

In the variable-speed transmission arrangement according to the invention, this direct drive can be implemented by the structural incorporation of the appropriate third clutch directly or indirectly between the input and the output shafts.

Even when the direct drive is implemented in the variable-speed transmission arrangement according to the invention, two tooth engagements are also included in the power transmission, but they may have an efficiency higher than 99%, so that it is still possible to achieve an overall efficiency which is well above that of the variable transmission ratios of the upper driving mode.

In the variable-speed transmission arrangement according to the invention, the constant overall transmission ratio for the upper driving mode may be designed to be unequal to 1, that is to say, for example, may have an overdrive characteristic.

However, the constant overall transmission ratio may be equal or unequal to 1.

In a particular embodiment of the variable-speed transmission arrangement, the constant overall transmission ratio is designed to be unequal to 1.

In an advantageous embodiment, the mechanical outlay necessary for the third clutch of the constant overall transmission ratio is kept low because the clutch components of the first clutch (for the lower speed driving mode) and of the third clutch are combined in a common subassembly, so that the additional construction space requirement is relatively small.

The invention will be described in more detail below in connection with eight embodiments illustrated diagrammatically in the accompanying drawings:

DESCRIPTION OF THE EMBODIMENT

Figure 1:
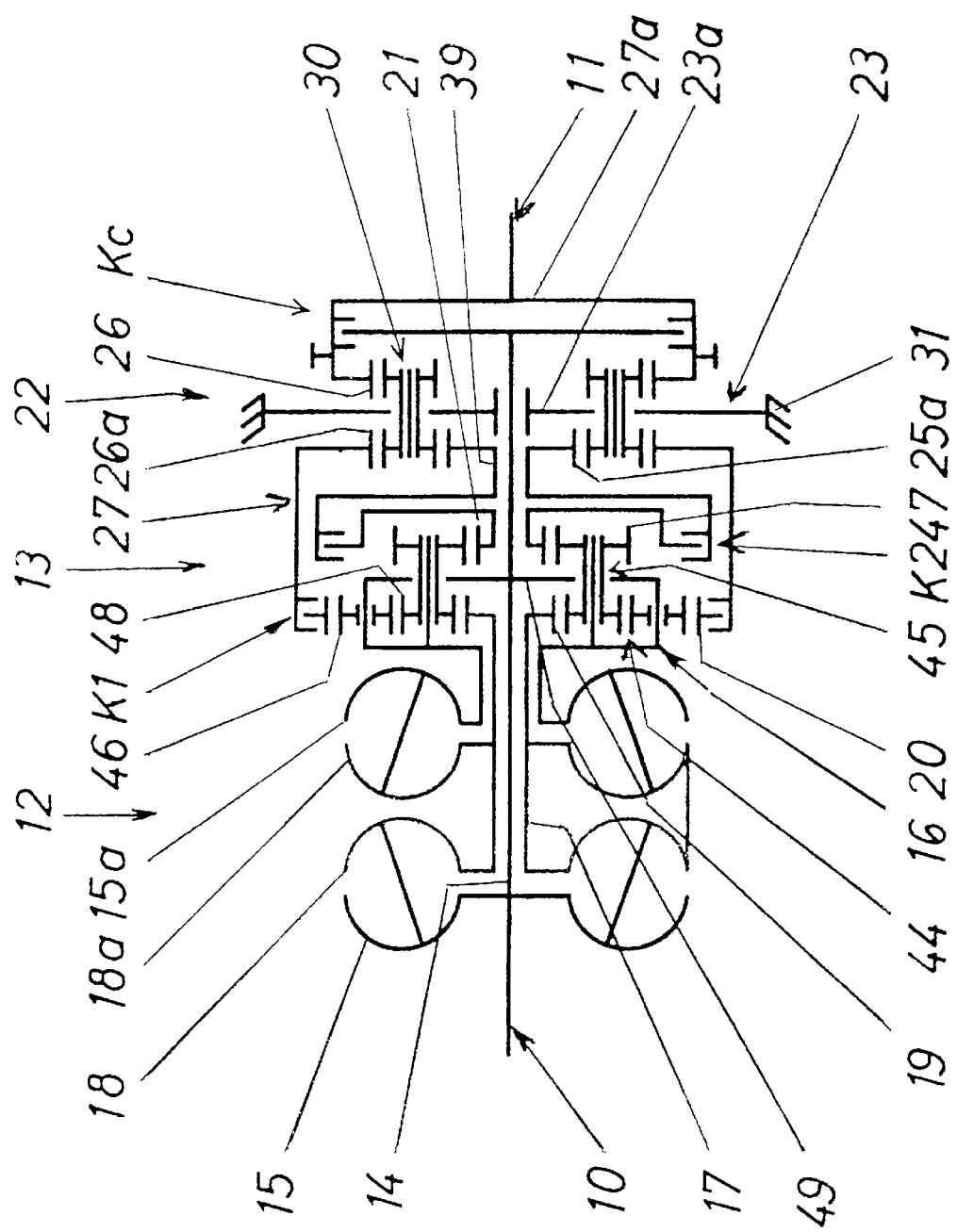
FIG. 1 shows a basic axial section through the variable-speed transmission arrangement according to the invention in a first embodiment.

The eight embodiments are identical in the following features:

Arranged in the torque transmission path between a central input shaft 10 and a coaxial output shaft 11 are a continuously variable toroidal transmission 12, an aggregating planetary transmission 13 and a planetary reversing transmission 22. Provided coaxially to, and movable with, the input shaft 10, is a central intermediate shaft 14 which is connected to an input drive disc 15 of the toroidal transmission 12 which includes two toroidal drives and to a two-shaft planet carrier 16 forming a first transmission member of the aggregating transmission 13. The planet carrier 16 additionally is drivingly connected to the other input drive disc 15a of the toroidal transmission 12 for transmitting power thereto.

Arranged co-axially with the input shaft 10 and concentrically around the central intermediate shaft 14 is a hollow intermediate shaft 17, which connects the two driven discs 18, 18a of the toroidal transmission 12 to a first sun gear 19 forming a second transmission member of the aggregating transmission 13.

The aggregating transmission 13 includes a third transmission member in the form of an outer ring gear 20, and a first clutch K1 providing selectively for an indirect or direct drive connection 27 or 27a between the third transmission member and the output shaft 11 for a lower speed driving mode.

The aggregating transmission 13 has a fourth transmission member in the form of a second sun gear 21, by way of which an indirect drive connection 39 can be established to on the output shaft 11 by means of a second shift clutch K2 (shift brake B2 in FIG. 3) in a higher speed driving mode.

Figure 4:
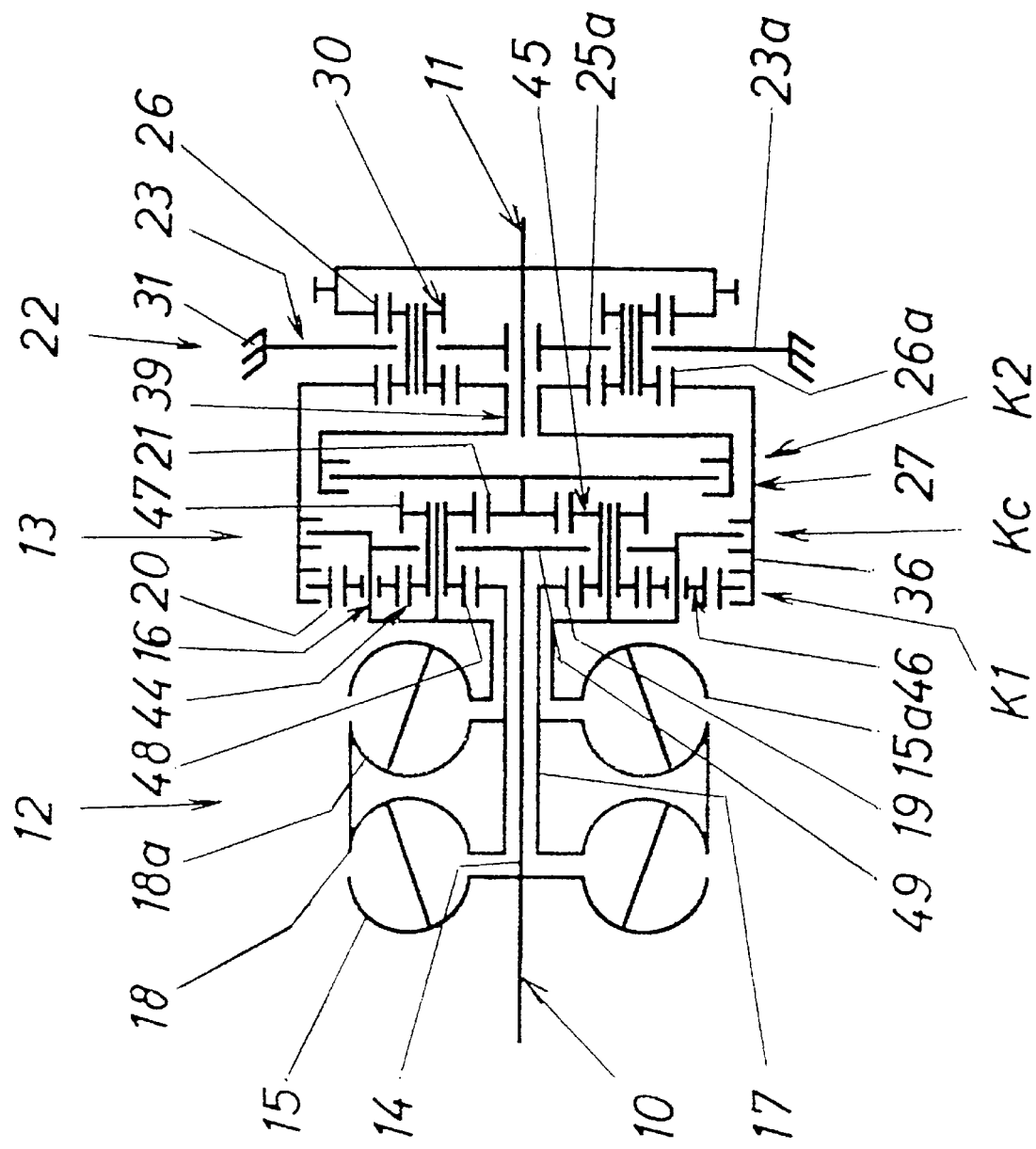
FIG. 4 shows a basic axial section through the variable-speed transmission arrangement according to the invention in a fourth embodiment.
Figure 5:
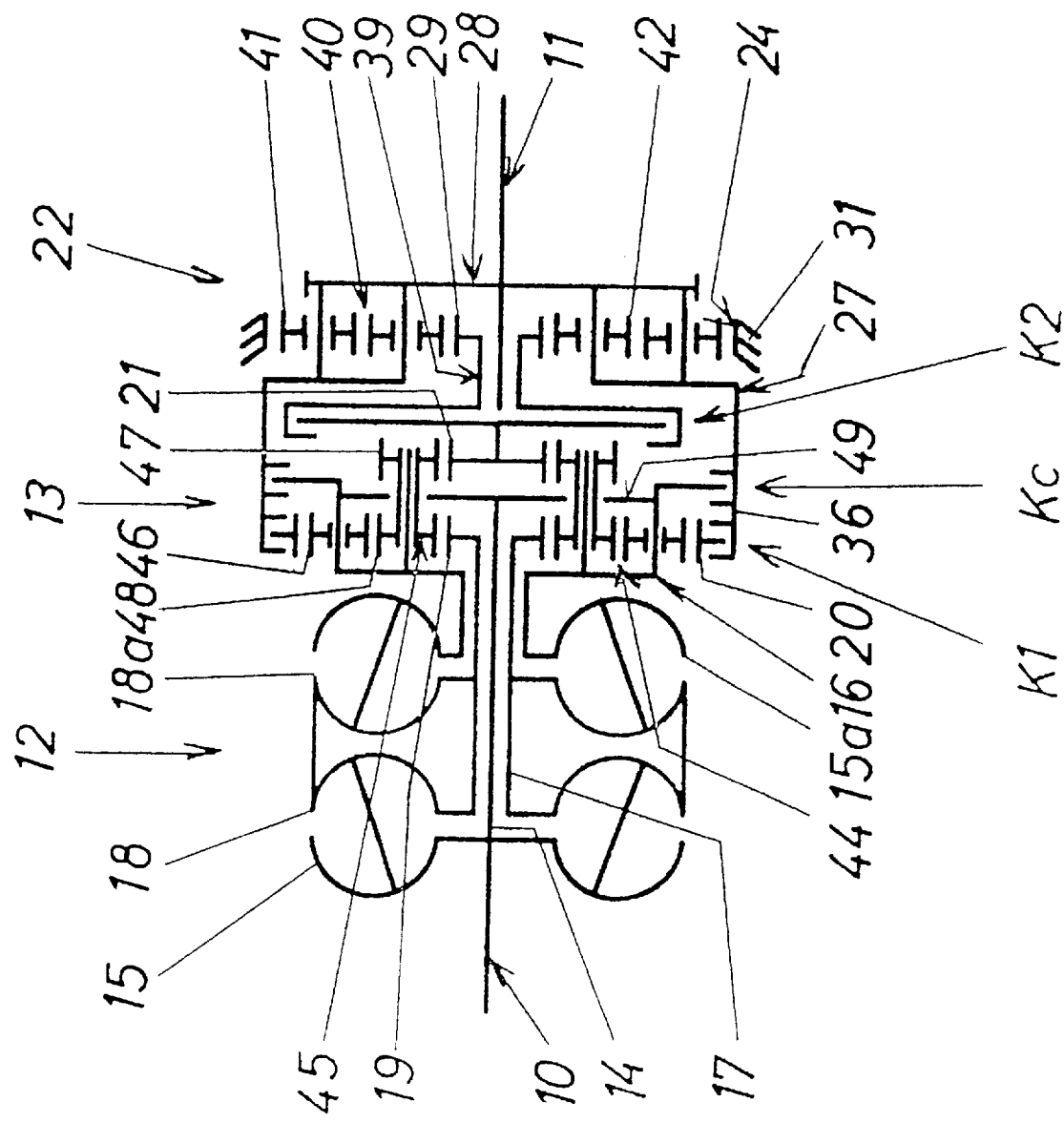
FIG. 5 shows a basic axial section through the variable-speed transmission arrangement according to the invention in a fifth embodiment.
Figure 6:
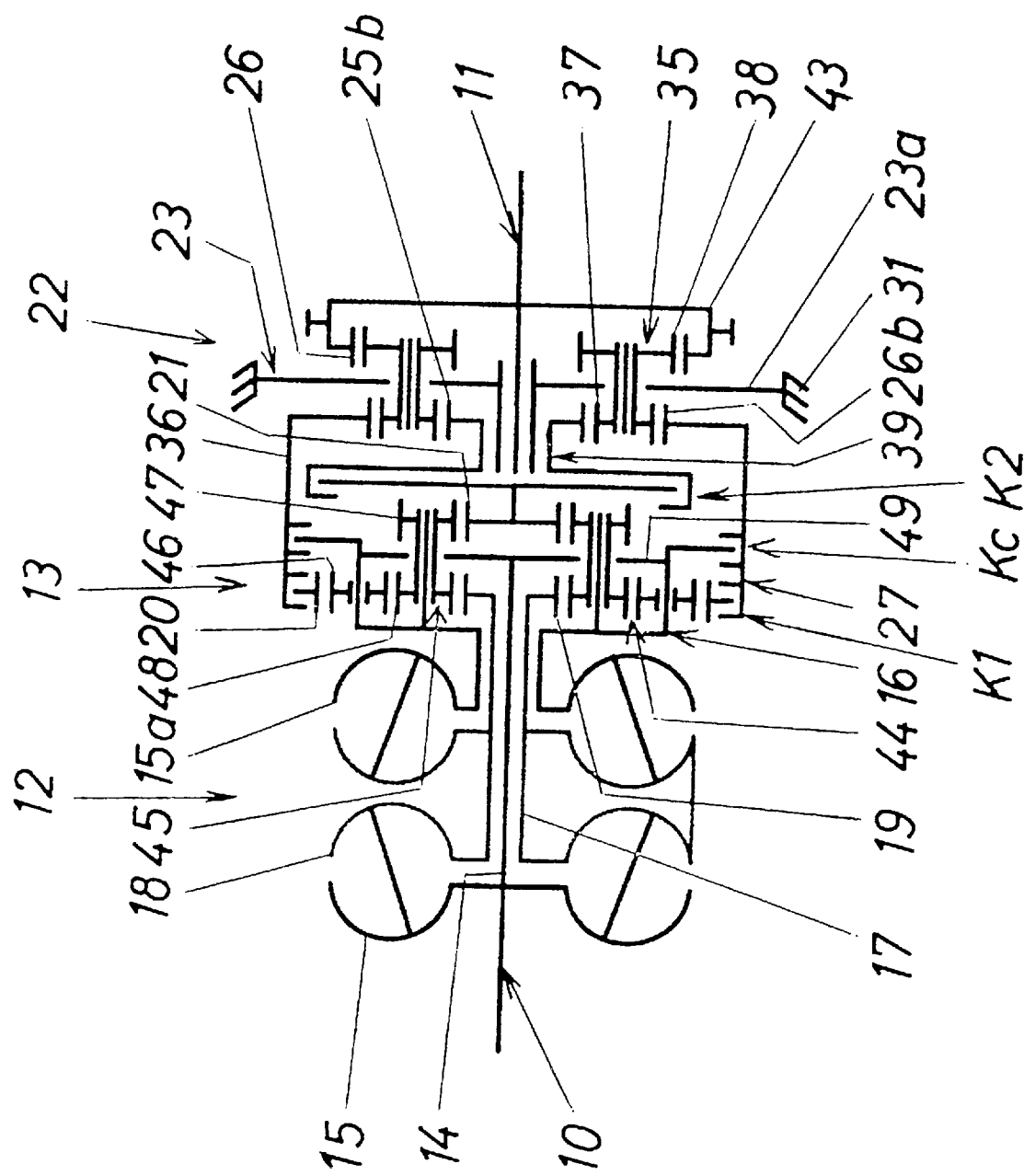
FIG. 6 shows a basic axial section through the variable-speed transmission arrangement according to the invention in a sixth embodiment.
Figure 7:
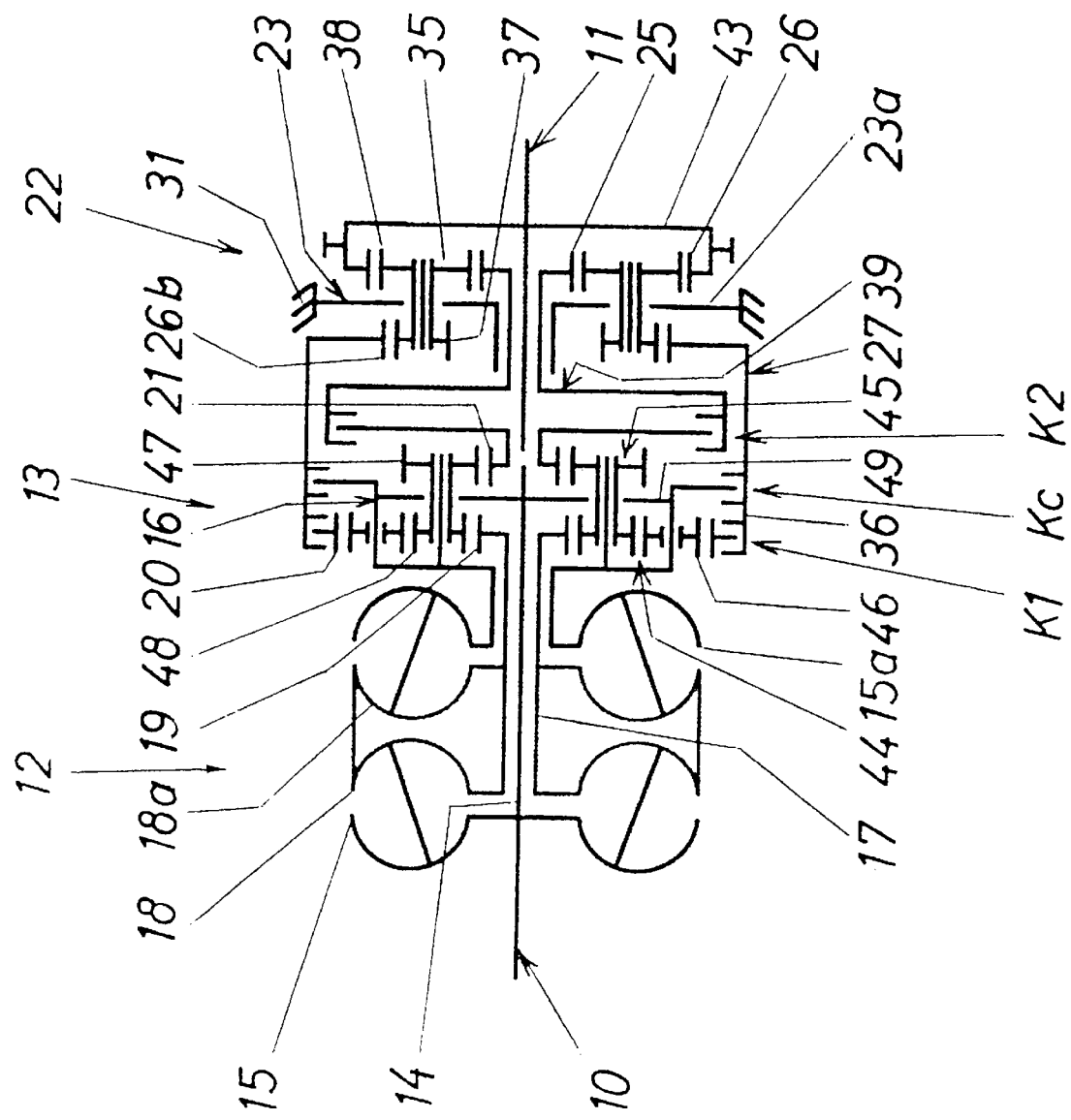
FIG. 7 shows a basic axial section through the variable-speed transmission arrangement according to the invention in a seventh embodiment.
Figure 8:
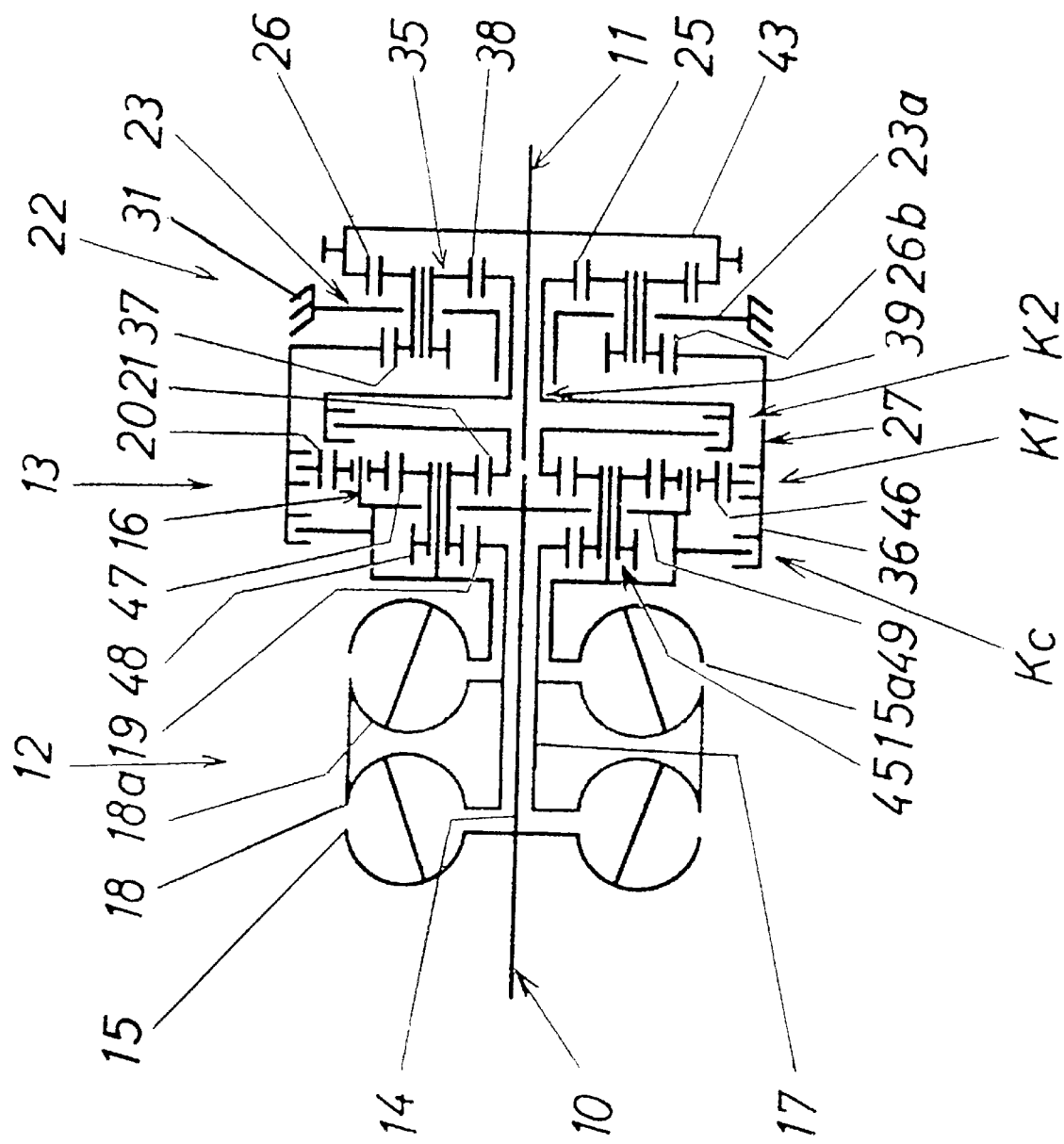
FIG. 8 shows a basic axial section through the variable-speed transmission arrangement according to the invention in an eighth embodiment.

The input shaft 10 can be drivingly connected to the output shaft 11 so as to by-pass the toroidal transmission 12 by the activation of a third clutch Kc at a transmission ratio $i_G$=const, $i_G$ being equal to 1:1 (that is to say, as direct drive) in the embodiments of FIGS. 1 to 5, but so as to be lower than 1 in the embodiments of FIGS. 6 to 8.

The third clutch Kc providing for direct drive is connected, on the one hand, to the central intermediate shaft 14 in the embodiment of FIG. 1 but, in the embodiments of FIGS. 2 to 5, it is indirectly connected to the intermediate shaft 14 by the planet carrier 16.

Figure 2:
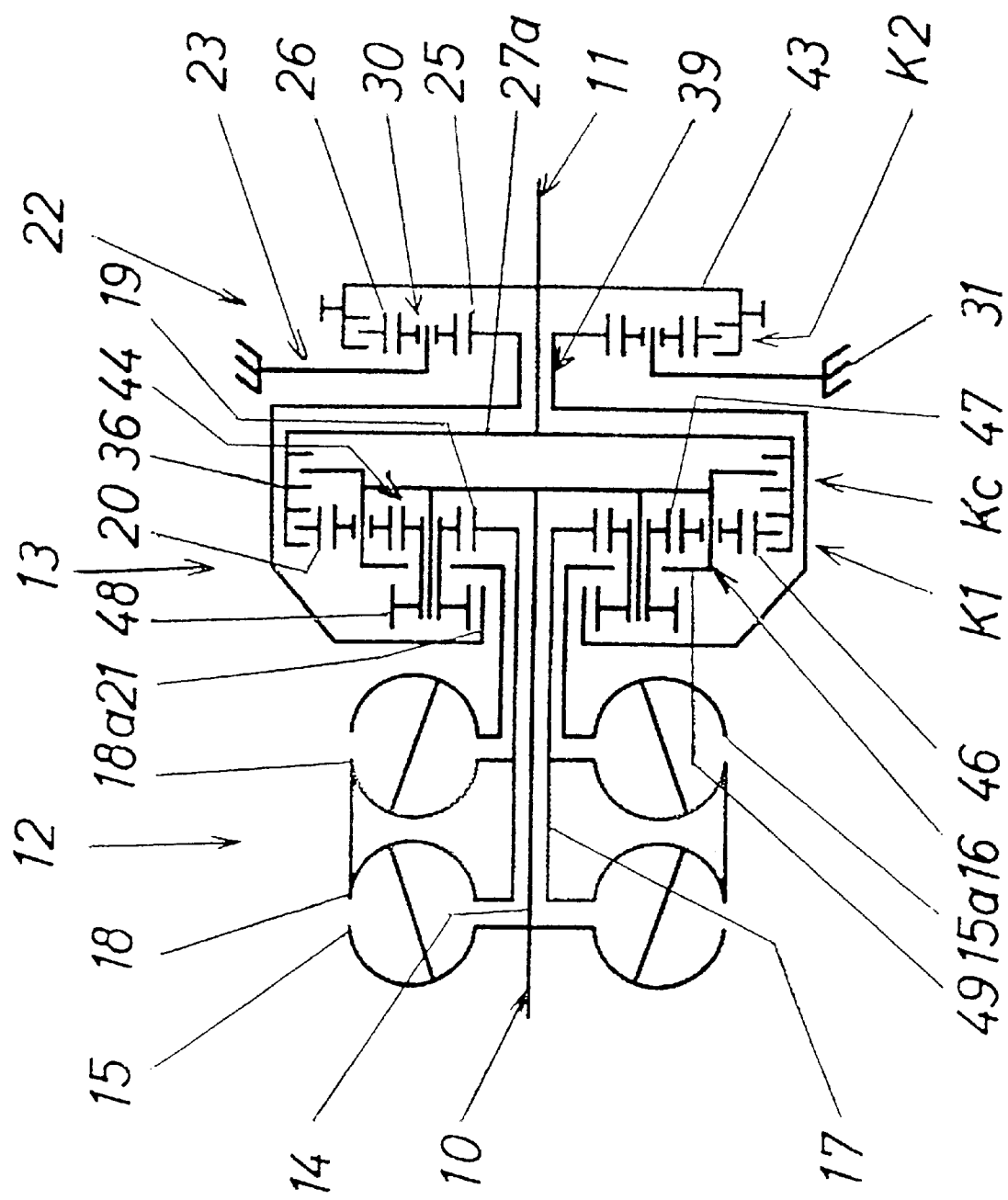
FIG. 2 shows a basic axial section through the variable-speed transmission arrangement according to the invention in a second embodiment.
Figure 3:
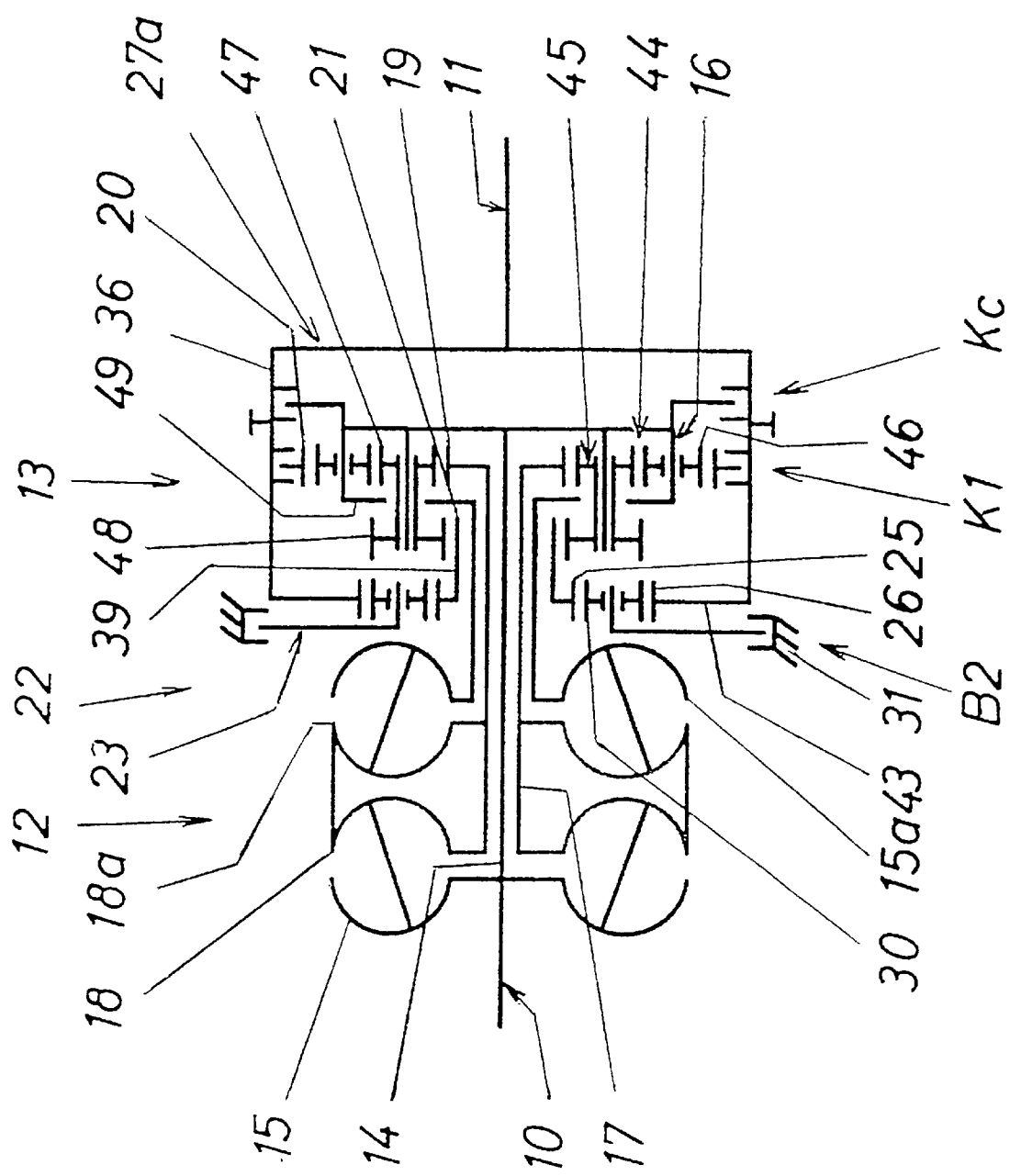
FIG. 3 shows a basic axial section through the variable-speed transmission arrangement according to the invention in a third embodiment.

For direct drive, the shift clutch Kc is, on the other hand, connected in the embodiments of FIGS. 1 to 3 directly to the output shaft 11 via the drive connection 27a. In the embodiments of FIGS. 4 and 5, the third clutch Kc provides for a drive-connection to the output shaft 11 indirectly via the drive connection 27 and the reversing transmission 22.

In the embodiment of FIG. 4, the drive connection 27 is additionally connected to the first shift clutch K1 which, in the embodiment of FIG. 1, is likewise coupled to the output shaft 11 by means of the drive connection 27 containing the reversing transmission 22. The two embodiments are therefore designed identically. The respective first shift clutch K1 is connected to one (ring gear 26a) of two ring gears 26 and 26a of the reversing transmission 22 of which the other (ring gear 26) is connected to the output shaft 11. These ring gears 26, 26a are arranged axially at opposite sides of a radial supporting web 23a forming a planet carrier 23. The supporting web 23a is secured non-rotatably in relation to a non-rotating case part 31 of the transmission case. Mounted rotatably on the planet carrier 23 are planetary gears 30, which mesh with the respective ring gears 26, 26a, which have the same number of teeth and therefore provide for the transmission ratio 1:1 between the input shaft 10 and the output shaft 11.

In the embodiment of FIG. 5, the drive connection 27 is designed in such a way that it forms a clutch drum 36 which includes the first and second shift clutches K1 and Kc is arranged concentrically on the outside of the aggregating transmission 13 and coaxially to the intermediate shaft 17 and is connected for rotation with a two-shaft planet carrier 28 of the reversing transmission 22. Mounted on the planet carrier 28 are double planets 40 which consist of two intermeshing individual planets 41, 42. The respectively outer individual planet 41 meshes with an annular gear structure 24 disposed on a non-rotating case part 31, whilst the respectively inner individual planet 42 meshes with an sun gear 29 which is connected by means of the drive connection 39 to the second shift clutch K2 of the aggregating transmission 13.

In the embodiment of FIG. 2, the planetary reversing transmission 22 is arranged structurally at the output end adjacent to the output shaft 11, but, in the embodiment of FIG. 3, it is disposed at the input end of the respective aggregating transmission 13. In both instances, planets 30 are mounted on a simple planet carrier 23 mesh, respectively with a sun gear 25 and with an outer ring gear 26.

In the embodiment of FIG. 2, the planet carrier 23 is secured non-rotatably to a non-rotating case part 31, and also the ring gear 26 is connected by means of the second clutch K2 to a drive web 43 fixed for rotation with the output shaft 11. The sun gear 25 is coupled to the second sun gear 21 of the aggregating transmission 13 by means of the drive connection 39. Instead of a shift clutch K2 for the second shift element, a shift brake B2 according to the embodiment of FIG. 3 may also be used.

In the embodiment of FIG. 3, the planet carrier 23 can be secured non-rotatably in relation to a non-rotating case part 31 by means of the shift brake B2. The ring gear 26 is connected for rotation with a drive web 43 which is mounted to the clutch drum 36 including the shift clutches K1 and Kc and which is mounted to the output shaft 11. The sun gear 25 of the reversing transmission 22 and the sun gear 21 of the aggregating transmission 13 are rigidly connected to one another by means of the drive connection 39. The planet carrier 23 may also be firmly connected to the case part 31, instead of by means of a brake B2. In that case, a shift clutch K2 would have to be provided for the second shift element between the ring gear 26 and the clutch drum 36.

In the embodiments with direct drive of FIGS. 1 to 5, and also in the embodiments of FIGS. 6 to 8, the aggregating transmission 13 is, in principle, designed as follows:

The planet carrier 16 has double planets 44 and a radial drive web 49 connected for rotation with the central intermediate shaft 14. The double planets 44 consist each of main and secondary planets 45 and 46, which intermesh. The main planets 45 have a first planet gear 47, located on that side of the drive web 49 which faces away from the toroidal transmission 12, and a second planet gear 48, located on that side of the drive web 49 which faces the toroidal transmission 12. The secondary planets 46 mesh with the ring gear 20.

Of the main planets 45 of the embodiments of FIGS. 1 and 4 to 8, the first planet gear 47 meshes with the inner central wheel 21 and the second ring gear 48 meshes with the first sun gear 19.

Of the main planets 45 of the embodiments of FIGS. 2 and 3, the first planet gear 47 meshes with the first sun gear 19 and the second ring gear 48 meshes with the second sun gear 21.

In the embodiments of FIGS. 1 and 4 to 7, the secondary planets 46 arranged on the side of the drive web 49 which faces the toroidal transmission 12 mesh with the second planet gear 48 of the associated main planet structure 45.

In the embodiments of FIGS. 2, 3 and 8, the secondary planets 46 arranged on the side of the drive web 49 which faces away from the toroidal transmission 12 mesh with the first planet gear 47 of the associated main planet structure 45.

The planet gears 47 and 48 of the main planets 45 have equal numbers of teeth in the embodiments of FIGS. 5 and 6, but unequal numbers of teeth in the remaining embodiments. The planet gear 47 has the larger number of teeth in the embodiments of FIGS. 1, 4, 7 and 8, but, in the embodiments of FIGS. 2 and 3, the planet gear 48 is larger.

The main planets 45 do not need to be provided with the number of teeth as described above. In all the embodiments of the invention the planet gears 47 and 48 may also have either equal or unequal numbers of teeth.

In the versions of FIGS. 6 to 8, the reversing transmission 22, which is disposed in the torque path of the drive connection 27 between the shift clutch Kc and the output shaft 11 a planet carrier 23, supports a stepped planet structure 35 and is firmly mounted to a non-rotating case 31 part by means of a radial supporting web 23a. The planet gear 38 of the stepped planet structure 35 which has the larger number of teeth and is located on the side of the supporting web 23a which faces away from the aggregating transmission 13 meshes with an outer ring gear 26 mounted to the output shaft 11 by means of a radial drive web 43. The planet gear 37 of the stepped planet structure 35, which has the smaller number of teeth and is located on the side of the supporting web 23a which faces the aggregating transmission 13, meshes with an outer ring gear 26b, which is connected by way of the clutch drum 36 to the clutch halves of the shift clutches K1 and Kc for the transfer of the drive torque to the output shaft 11.

The second shift clutch K2 is connected by means of its drive connection 39, in the versions of FIGS. 7 and 8, to the sun gear 25 meshing with the respectively larger planet gear 38, but, in the version of FIG. 6, to the sun gear 25b meshing with the respectively smaller planet gear 37.

The clutch drum 36 used in the versions of FIGS. 2 to 8 provides a structurally advantageous arrangement for the shift clutches K1 and Kc and for their drive connection to the output shaft 11. The arrangement makes it possible to have a common operating medium supply and a common support structure for the output-side clutch halves and to have structurally identical clutch actuators.

The following working method is common to the eight embodiments:

By virtue of the geared-neutral function, during the start-up operation, with a first shift clutch K1 engaged and with the second shift clutch K2 or the shift brake B2 and the third shift clutch Kc being in the disengaged state, the respective rotational speed of the output shaft 11 and of the transmission members connected directly to the shift clutch K1 is first equal to zero and the part transmission ratio in the toroidal transmission 12 is set at a predetermined value.

In the following lower driving mode with lower rotational speeds of the output shaft 11, the first shift clutch K1 remains engaged. During forward driving, the power flows via the direct path of the central intermediate shaft 14 to the aggregating transmission 13 and is branched, one part flowing via the first shift clutch K1 to the output shaft 11 and the other part flowing back via the toroidal transmission 12 to the hollow intermediate shaft 17 and to the planet carrier of the aggregating transmission. Circulating power thus occurs in the transmission arrangement and the power in at least one of the paths is higher than the transmission input power. The output shaft speed can then be controlled by changing the transmission ratio of the toroidal transmission in a low speed driving mode. To change the driving mode, a synchronous point can be selected, at which the differential rotational speed at the second shift clutch K2 or the rotational speed at the shift brake B2 is zero, so that a jolt-free drive transfer from the first shift clutch K1 to the second shift clutch K2 or the shift brake B2 becomes possible thereby switching to a higher speed driving mode. In this higher speed driving mode, the transmission input power is, in general, apportioned to two parallel paths, so that the power fraction in both paths (toroidal transmission 12, on the one hand, and central intermediate shaft 14 on the other hand) is lower than the transmission input power. Circulating power does not occur.

A synchronous point can again be selected when the variable-speed transmission arrangement is in the position with a constant overall transmission ratio, that is when the third shift clutch Kc is engaged. The change of drive from the shift clutch K2 or the shift brake B2 to the shift clutch Kc of the upper driving mode can thus also be carried out in a jolt-free manner.

What is claimed is:

1. A variable-speed transmission arrangement, including a continuously variable toroidal transmission (12) and a planetary aggregating transmission (13) arranged in the power transfer path between an input shaft (10) and a coaxial output shaft (11), including:
a central intermediate shaft (14) connected to said input shaft (10) for rotation therewith,
first and second input drive discs (15, 15a) of the toroidal transmission (12) mounted for rotation with said input shaft (10) and said central intermediate shaft (14),
a planet carrier (16) forming a first transmission member of the aggregating transmission and being mounted on said central intermediate shaft (14) for rotation therewith, and also being connected to said second input drive disc (15a) for rotation therewith, a concentric hollow shaft (17) arranged coaxially with said input shaft (10) and through which said central intermediate shaft (14) extends, central driven discs (18, 18a) of said toroidal transmission (12) mounted to said concentric hollow shaft (17) for rotation therewith, a first sun gear (19) mounted on said concentric hollow shaft (17), for rotation therewith a first ring gear (20) of said planetary aggregating transmission (13) surrounding said first sun gear (19) in spaced relationship, a first clutch element (K1) disposed adjacent said first ring gear (20) for engaging said first ring gear (20) to establish a drive connection between said first ring gear (20) of said aggregating transmission (3) and said output shaft (10) in a low range driving mode for lower driving speeds, a second sun gear (21) disposed in said aggregating transmission (13), a second clutch element (K2) for operatively engaging said second sun gear (21) so as to establish a drive connection between said second sun gear (21) of said aggregating transmission (13) and said output shaft (11) in an upper driving mode with higher driving speeds, and a third clutch element (Kc) for establishing a direct drive connection between the input shaft (10) and the output shaft (11), while bypassing the toroidal transmission (12).

2. An arrangement according to claim 1, wherein the constant overall transmission ratio ($i_G$=const) between the input and the output shaft is equal to 1 (direct drive).

3. An arrangement according to claim 2, wherein said third clutch element (Kc) when engaged provides for a direct drive connection between the central intermediate shaft (49) and the output shaft (11).

4. An arrangement according to claim 2, wherein said third clutch element provides for an indirect drive connection between the central intermediate shaft and the output shaft in the form of a connection between the planet carrier of the aggregating transmission and the output shaft.

5. An arrangement according to claim 2, wherein a planetary reversing transmission (22) is arranged in the power transmission path between the aggregating transmission and the output shaft (11), and in which a first transmission member (23 or 24) is arranged which, in an immovable stationary state, provides for two further transmission members (25,26/28,29) of the reversing transmission (22) to rotate in opposite directions, and in which one (26) of the two transmission members is mounted for rotation with the output shaft and the other is connected to the second sun gear (21) of the aggregating transmission by means of the second clutch element (13) for the upper driving mode and the third clutch element (Kc) for the constant overall transmission ratio between the input (10) and output shaft (11) is arranged in a drive connection between the planet carrier of the aggregating transmission and the transmission member of the reversing transmission, which is connected to the output shaft.

6. An arrangement according to claim 5, wherein said reversing transmission includes a planet carrier supporting said planet gears which mesh with two ring gears which have equal numbers of teeth and rotate in the same direction and with a sun gear which has a different number of teeth and rotates in the opposite direction, the planet carrier of the reversing transmission being secured non-rotatably to a non-rotating case part by means of a radial supporting web, the two central wheels of equal number of teeth being arranged axially on opposite sides of said supporting web, and one of the two ring gears of equal number of teeth being connected directly to the output shaft, but being connected indirectly, via the other of the two ring gears of equal number of teeth, to the third clutch element, for providing an overall transmission ratio of 1:1 between the input and output shaft.

7. An arrangement according to claim 5, wherein the reversing transmission includes an annular gear structure non-rotatably secured to the transmission case, a planet carrier supporting double planets and connected to the output shaft for rotation therewith, and a sun gear connected to the second clutch element for an upper driving mode, said double planets consisting of intermeshing individual planets which mesh with one of the two annular gears and the third clutch element being connected to the planet carrier of the reversing transmission providing a constant overall transmission ratio ($i_G$=const) between the input and the output shaft.

8. An arrangement according to claim 7, the constant overall transmission ratio ($i_G$=const) between the input and the output shaft is unequal to 1.

9. An arrangement according to claim 8, wherein the reversing transmission includes as the first transmission member a planet carrier with at least one multi-step planet structure, said at least one multi-step planet structure meshes with two ring gears mounted on a common shaft for the same direction of rotation but having a different number of teeth, and with a sun gear having an opposite direction of rotation and connected to the second clutch element, for a higher speed driving range, the planet carrier is secured to a non-rotating case part by means of a radial supporting web, the two sun gears of the same direction of rotation are arranged axially on opposite sides of said supporting web, and one of the two ring gears of the same direction of rotation is connected directly to the output shaft and is connected indirectly, via the other of the two ring gears of the same direction of rotation, to the third clutch element, for providing a constant overall transmission ratio ($i_G$=const) between the input and the output shaft.

10. An arrangement according to claim 9, wherein the one of the two ring gears of the same direction of rotation which has the larger number of teeth is connected to the output shaft.

11. An arrangement according to claim 10, wherein the at least one multi-step planet meshes, by means of its planet gear having the smaller number of teeth, with the sun gear which is connected to the second clutch element for the upper speed driving range.

12. An arrangement according to claim 9, wherein the at least one multi-step planet meshes, by means of its planet gear having the greater number of teeth, with the sun gear which is connected to the second clutch element, for the upper speed driving range.

13. An arrangement according to claim 5, wherein there is arranged in the power transfer path between the aggregating transmission and the output shaft a planetary reversing transmission in which a first transmission member, in its firmly braked state, brings two further transmission members of the reversing transmission into opposite directions of rotation to one another, and in which one of the two transmission members of the reversing transmission which are capable of being brought into opposite directions of rotation to one another, is connected to the output shaft and the other is connected to the second clutch element for an upper driving range, and the third shift element for the constant overall transmission ratio between the input and the output shaft is structurally a clutch disposed between the planet carrier forming the first transmission member of the aggregating transmission, and a fourth transmission member of the reversing transmission and the fourth transmission member and the transmission member connected to the output shaft having the same direction of rotation.

14. An arrangement according to claim 1, wherein a cylindrical clutch drum is drivingly connected to the output shaft and is arranged so as to surround the aggregating transmission and arranged concentrically to the latter, and clutch halves, assigned to the output shaft, both of the first clutch element for the lower driving mode and of the third clutch element, for the constant overall transmission ratio ($i_G$=const) between the input and the output shaft are firmly mounted on the clutch drum for rotation therewith.

* * * * *